United States Patent [19]

Galdes

[11] Patent Number: 4,792,153
[45] Date of Patent: Dec. 20, 1988

[54] TRAILER HITCH

[76] Inventor: Emmanuel Galdes, 1130 Channing Ave., Palo Alto, Calif. 94301

[21] Appl. No.: 903,623

[22] Filed: Sep. 5, 1986

[51] Int. Cl.⁴ .............................................. B60D 1/14
[52] U.S. Cl. ................................................. 280/478 B
[58] Field of Search ............... 280/477, 478 R, 478 A, 280/478 B, 456 R, 462; 292/57, 60, 61

[56] References Cited

U.S. PATENT DOCUMENTS

| 2,323,559 | 7/1943 | Mills | 292/60 X |
| 3,361,446 | 1/1968 | Jeffes | 280/478 B |
| 3,437,355 | 4/1969 | Jeffes | 280/478 B |
| 3,521,908 | 7/1970 | Carter | 280/478 B |
| 4,125,272 | 11/1978 | Putnam, Jr. et al. | 280/478 B |
| 4,606,549 | 8/1986 | Williams, Jr. | 280/477 X |

FOREIGN PATENT DOCUMENTS 305033  4/1922  Fed. Rep. of Germany ... 280/478 A

Primary Examiner—David M. Mitchell
Assistant Examiner—Charles R. Watts
Attorney, Agent, or Firm—Townsend & Townsend

[57] ABSTRACT

A trailer hitch adapted to be attached to a towing vehicle and to be removably connected to a vehicle to be towed. The trailer hitch includes a tubular housing open at the rear end thereof and adapted to be rigidly attached to the towing vehicle. A hitch bar is slidably mounted in the housing and comprised of a front segment slidably received in the housing and a rear segment pivotally mounted on the rear end of the front segment for rotation about a generally vertical axis. A hitch ball is mounted on the rear end of the rear segment and is pivotal through an angle of approximately 180°, i.e., an angle of 90° on either side of a center line extending longitudinally of the hitch bar. The housing has a pair of side bolts shiftably mounted thereon for insertion into respective side grooves or recesses in the sides of the front segment of the hitch bar. The bolts limit the rearward travel of the hitch bar relative to the housing and allow forward movement of the front segment of the hitch bar until the inner ends of the bolts enter recesses in the side of the front segment of the hitch bar to thereby lock the hitch bar to the housing. A shaft is removably coupled to the rear segment and the hitch bar when the hitch ball is in its forwardmost position to thereby positively lock the hitch bar to the pivotal housing during a towing phase of the use of the trailer hitch.

1 Claim, 2 Drawing Sheets

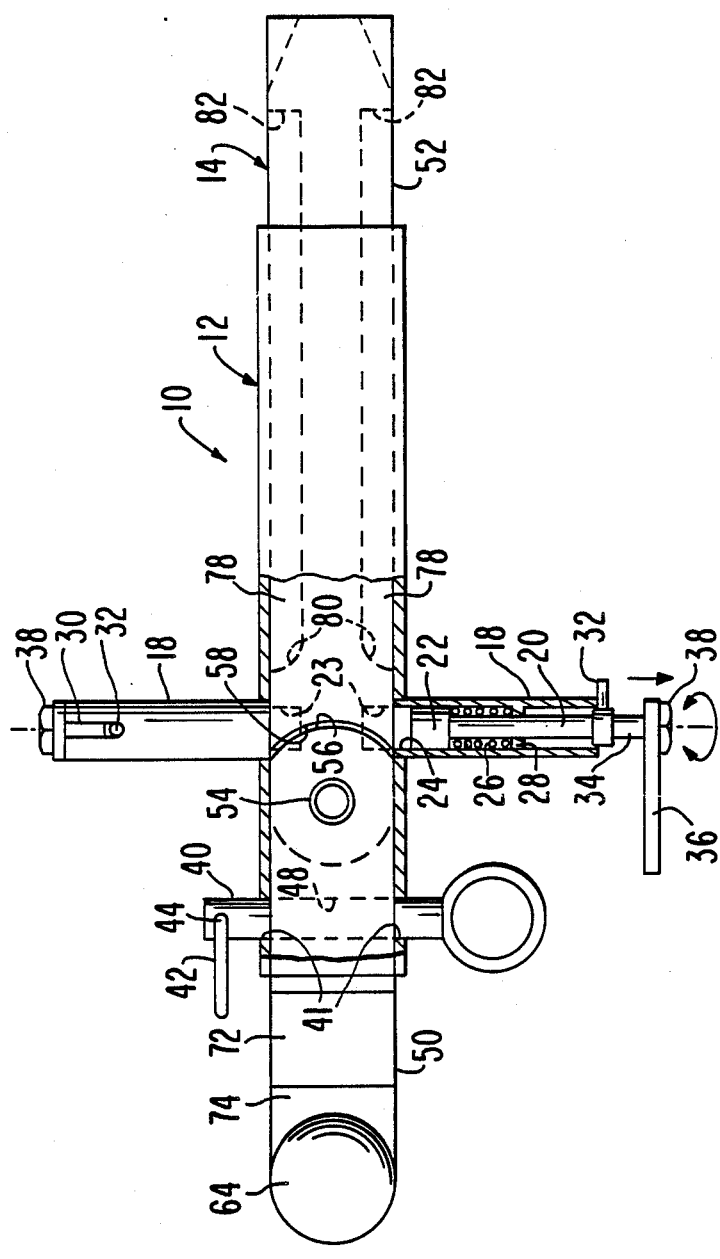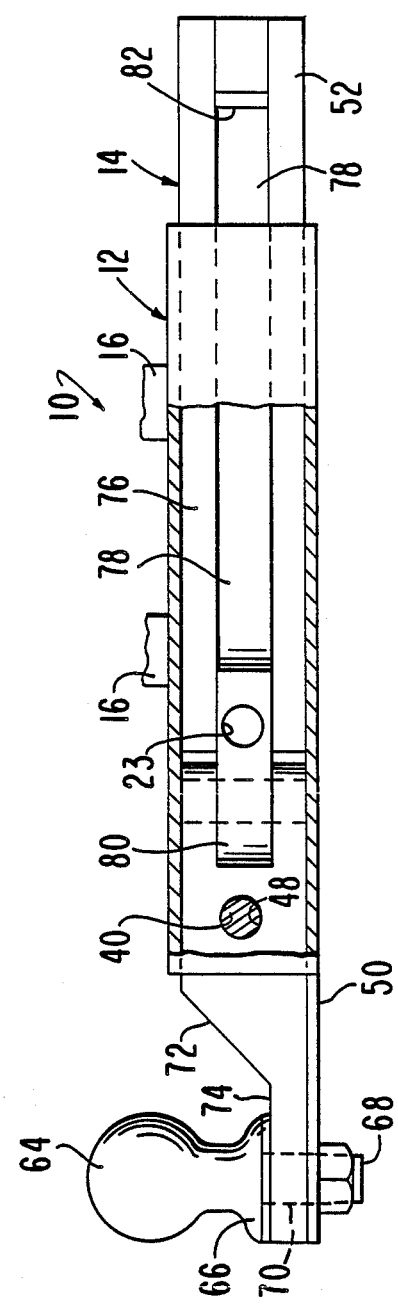
FIG. 1
FIG. 2

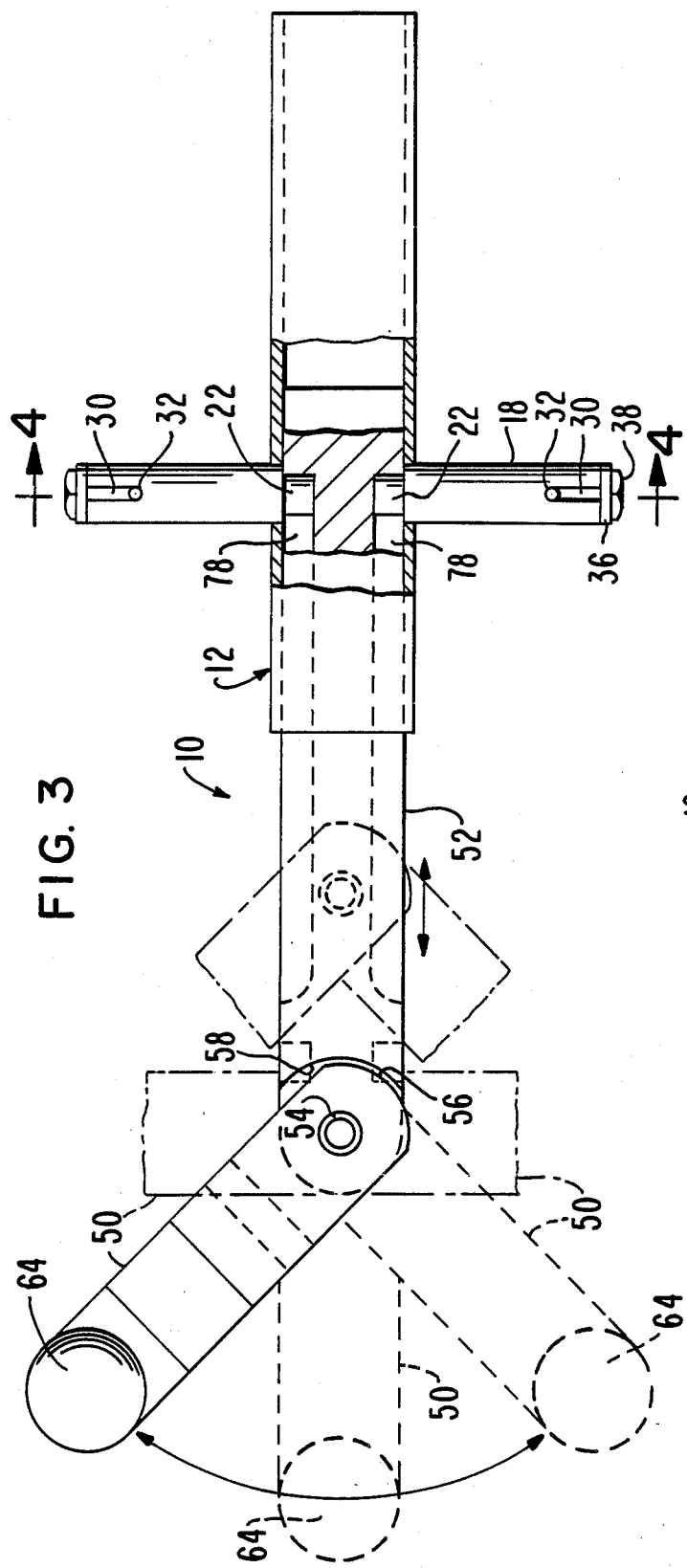
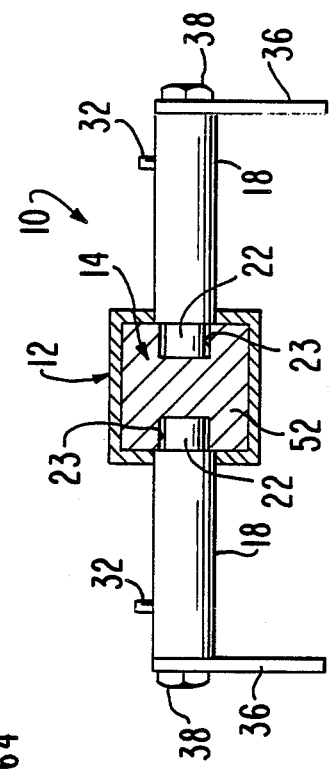

TRAILER HITCH

BACKGROUND OF THE INVENTION

1. Field of the Invention

This invention relates to improvements in the attachment of towed vehicles to towing vehicles, and more particularly, to an improved trailer hitch which allows misalignment of a towing vehicle with respect to a vehicle to be towed as the vehicles are being coupled together.

Trailer hitches typically have a hitch ball mounted on a hitch bar rigidly secured to a towing vehicle. This ball is adapted to be coupled to the socket on the tongue of a vehicle or trailer to be towed. Generally, with trailer hitch assemblies of this type, the towing vehicle must be moved in reverse with the ball properly aligned with the trailer socket to make the necessary connection.

2. Description of the Prior Art

Attempts have been made to solve a misalignment problem when the socket of a vehicle to be towed is not properly aligned with the ball of the towing vehicle when the latter is moving in reverse. U.S. Pat. Nos. 3,860,267 and 4,350,362 disclose trailer hitches having singable bars which pivot in a horizontal plane to accommodate such misalignment between a towing vehicle and a trailer. However, both patents show a one-piece bar movable out of a bar-like housing, but such construction does not allow the user to pivot the bar until the bar is completely out of the housing. This is the main drawback of the trailer hitch of U.S. Pat. No. 3,860,267.

U.S. Pat. No. 4,350,362 shows a slightly different trailer hitch in that it does not have a long, slender housing for supporting the main hitch bar. The hitch bar of U.S. Pat. No. 4,350,362 has the same drawback as U.S. Pat. No. 3,860,267 in that it has a hitch bar which cannot pivot about a vertical axis until the full length of the hitch bar is pulled outwardly from its retracted position.

Because of the foregoing drawbacks, a need exists for an improved trailer hitch which gives greater flexibility in coupling a towing vehicle, to a towed vehicle such as a trailer. The present invention satisfies this need.

SUMMARY OF THE INVENTION

The present invention is directed to a trailer hitch of improved construction which is simple and rugged in construction and which provides greater flexibility in maneuvering a towing vehicle into position to be hitched to a vehicle to be towed, such as a trailer. To this end, the present invention includes a tubular bar-like housing adapted to be coupled to a towing vehicle a hitch bar is shiftably mounted on the housing and is movable longitudinally thereof from a first retracted position in the housing to a second position extending rearwardly of the housing. The hitch bar is comprised of a front segment and a rear segment, the segments being pivotally coupled at adjacent ends thereof by a pivot shaft. A hitch ball is mounted on the rear end of the rear segment. The lengths of the segments are such that the hitch bar need only to be shifted a short distance rearwardly of the housing so that the pivot shaft will clear the rear open end of the housing and allow pivotal movement of the rear segment relative to the front segment. This allows for greater flexibility in that the full length of the hitch bar need not be pulled outwardly of the housing to allow pivotal movement of the hitch ball on the rear segment. Thus, the present invention avoids the limitations of the prior art as mentioned above.

The trailer hitch of the present invention further includes safety features which limit the forward and rearward movements of the hitch bar relative to the housing. To this end, bolt means is provided on the housing for insertion into grooves in the sides of the hitch bar to lock the hitch bar in a forwardmost position and to prevent rearward movement of the hitch bar beyond a predetermined location along the length thereof.

Thus, the present invention provides an improved trailer hitch which is versatile and comprised of a relatively few number of parts, yet the hitch is simple to use and allows greater ease in connecting a vehicle to be towed to a towing vehicle notwithstanding a misalignment between the two vehicles.

The primary object of the present invention is to provide an improved trailer hitch which has a two-segment hitch bar provided with a hitch ball on the rear end thereof wherein the hitch bar is slidably carried by a tubular housing while the rear segment of the hitch bar can pivot through a relatively large angle about a vertical axis after the hitch bar has shifted rearwardly of the housing only through a relatively short distance to thereby provide greater flexibility in the attachment of a vehicle to be towed to a towing vehicle notwithstanding the misalignment between the two vehicles.

Other objects of this invention will become apparent as the following specification progresses, preference being had to the accompanying drawings for an illustration of the invention.

IN THE DRAWINGS

FIG. 1 is a top plan view of the trailer hitch of the present invention, parts being broken away and in section to illustrate details of construction;

FIG. 2 is a side elevational view, partly in section, of the trailer hitch of FIG. 1;

FIG. 3 is a view similar to FIG. 1 but showing the hitch bar extending outwardly from the tubular housing thereof; and FIG. 4 is a cross-sectional view taken along line 4—4 of FIG. 3.

DETAILED DESCRIPTION OF THE PREFERRED EMBODIMENT

The trailer hitch of the present invention is broadly denoted by the numeral 10 and includes a rigid, tubular housing 12 which is open at both ends thereof. For purposes of illustration, housing 12 is of steel and square in cross section as shown in FIG. 4. Housing 12 is adapted to slidably receive a hitch bar 14 which is also generally square in cross section. Thus, hitch bar 14 is complementally received within housing 12. The housing 12 is adapted to be secured in any suitable manner to a towing vehicle, such as at locations 16, whereby the hitch bar 14 can be operatively connected to the towing vehicle.

Housing 12 has a pair of sleeves 18 which are rigidly secured thereto at opposite sides of the housing and in alignment with each other. Each sleeve extends perpendicularly to the adjacent wall of housing 12 and shiftably receives a bolt 20 having an inner end 22 movable through the inner, open end 24 of the sleeve and into a position such as the dashed line position thereof shown in FIG. 1. A coil spring 26 within each sleeve 18 is held under compression between end portion 22 and an annular shoulder 28 within the sleeve to bias the bolt toward the inner open end 24 of the corresponding sleeve 18.

The outer end of each sleeve 18 is provided with a longitudinal slot 00 (FIG. 1) which is adapted to slidably receive a projecting pin 32 on the outer end portion 34 of the corresponding bolt 20, there being an arm 36 held by a nut 38 on the outer end of the bolt. To retract end portion 22 from the dashed line position of FIG. 1, the user pulls outwardly on arm 36 until pin 32 clears the open outer end of the corresponding sleeve 18; then, arm 36 and the corresponding bolt 20 are rotated until pin 32 engages the outer end of the adjacent sleeve 18, thereby holding end portion 22 out of the inner end 24 of the sleeve 18 and allowing movement of hitch bar 14 in housing 12. When both bolts 20 are in the full line position of FIG. 1, hitch bar 14 can be shifted longitudinally of the housing 12. Bolts 22 in the dashed line positions of FIG. 1 are used to prevent outward movement of the hitch bar 14 relative to housing 12 when the hitch bar is in an operating position as shown in FIG. 3 and described hereinafter.

A locking pin 40 (FIG. 1) is provided to lock hitch bar 14 to housing 12 when the hitch bar 14 is in the position thereof shown in FIG. 1. In this position, the hitch bar 14 is in condition for being attached to a towed vehicle and for towing the towed vehicle in a forward direction. Pin 40 has a cotter pin 42 removably mounted in a hole 44 thereof, there being a ring 46 on the opposite end of the shaft 40 for manually facilitating the manual removal of the shaft from and placement of the shaft into the bore 48 in hitch bar 14 which aligned with holes in the side walls of housing 12.

Hitch bar 14 is provided with a front segment 52 and a rear segment 50, the segments being pivotally connected together for rotation about a vertical axis by a pivot shaft 54. Segment 50 has a convex rear surface 56 complementally received within a concave recess 58 in the forward end of segment 52, the front portion of segment 52 being defined by a tongue 60 which is received within the spaced rear end portions 62 (FIG. 2) of front segment 50. Thus, rear segment 50 can rotate about a vertical axis relative to housing 12 and to front segment 52.

A hitch ball 64 has a base 66 provided with a shaft 68 which passes through a hole 70 in the rear end portion of rear segment 50, there being an inclined surface 72 extending from the upper surface of segment 50 to a lower surface 74 on which base 66 of ball 64 is supported. Ball 64 is adapted to be coupled to the hitch socket of a towed vehicle located rearwardly of ball 64.

Front segment 52 has a pair of sides provided with elongated recesses 78 therein as shown in FIGS. 1 and 2. Each recess 78 has a rear, curved surface 80 and a perpendicular flat front surface 82 (FIG. 1). The recesses 78 are adapted to receive the inner end portions 22 of bolts 20.

In use, housing 12 is secured to a towing vehicle in any suitable manner, such as at locations 16 on housing 12 as shown in FIG. 2. When it is desired to connect hitch ball 64 to a vehicle to be towed, and assuming that the hitch socket of the towed vehicle is not horizontally aligned directed behind hitch ball 64, shaft 40 is first removed from its operative position shown in FIG. 1. Then, bolts 20 are pulled outwardly so that inner end portions 22 of the bolts are out of the recesses 23 in the rear end of front segment 52 of hitch bar 14. Then, hitch bar 14 is moved rearwardly and then bolts 20 are released so that they can enter respective recesses 78 and slide along the recess as the hitch bar 14 is pulled rearwardly into a position shown in FIG. 3. In such position, the inner end portions 22 of bolts 20 engage the rear end faces 82 of recesses 78 and rear segment 50 of hitch bar 14 can be pivoted about the vertical axis of shaft 54. For instance, it can be moved from one of the dashed line positions of FIG. 3 to the full line position thereof so as to properly align the ball 64 with the trailer socket of the vehicle to be towed.

When the ball is connected to the socket, the towing vehicle to which housing 12 is coupled will be moved rearwardly and as it does so, hitch bar 14 will move relative to and inwardly of housing 12 because the inner end portions 22 of bolts 20 can slide along and relative to recesses 78 until the inner end portions engage the rear curved surface segments 80 (FIG. 1), whereupon the bolts 20 are cammed outwardly and then move along the outer surface of the adjacent sides of hitch bar 14 until the portions 22 become aligned with respective recesses 23. When this occurs, inner end portions 22 of bolts 20 move into recesses 23 under the bias forces of springs 26 and lock the hitch bar 14 to housing 12. In such a case, locking pin 40 can be inserted into bore 48 and through holes 41 to further lock hitch bar 14 to housing 12. The cotter pin 42 is inserted into hole 44 of locking pin 40 to secure the latter in place.

The present invention provides an improved trailer hitch for use on a towing vehicle wherein the vehicle to be towed can have its trailer socket to be hitched to the trailer hitch ball 64 at a location which is not directly behind the longitudinal axis of housing 12. Thus, the hitch ball can be pivoted into a desired position so that the ball can be more readily hitched to the trailer socket of a vehicle to be towed notwithstanding the misalignment of the towing and towed vehicles.

The hitch bar 14 is capable of being separated from housing 12. Thus, housing 12 can be conventional and hitch bar 14 can be fitted to the housing with no modification to the bar or the housing itself. Thus the bar does not require a special hitch housing.

As shown in FIG. 3, the trailer hitch 10 is operable for all locations of hitch bar 14 when hitch pin 54 is outwardly of the end of housing 12. Thus, the trailer hitch of the present invention is highly versatile and suitable for coupling many types of vehicles together.

I claim:

1. A trailer hitch comprising:
   a tubular housing adapted to be secured to a towing vehicle, the housing having a rear open end;
   a hitch bar shiftably mounted in the housing and movable relative thereto in opposed directions past said open end from a first operative position in which the hitch bar is in the housing to a second operative position in which the hitch bar is at least partially out of the housing, said hitch bar comprising a front segment and a rear segment;
   means pivotally mounting the rear segment on the front segment at the rear end of the latter for pivotal movement through an angle of 90° on each side of the longitudinal center line about a generally vertical axis when the pivot means is spaced rearwardly of said open end of the housing and when the hitch bar is in the second operative position;

a hitch ball mounted on the rear end of said rear segment;

means cooperable with the housing and the hitch bar for locking the hitch bar to the housing when the hitch bar is in said first and second operative positions, the front segment of said hitch bar having a pair of opposed side surfaces, each side surface having an elongated recess therein extending longitudinally of the front segment of the hitch bar, the rear end of the recess being defined by a cam surface and the front end of the recess being defined by a lateral stop, there being a bolt shiftably carried by each side of the housing respectively, each bolt being spring biased inwardly of the housing and having an inner end portion receivable within the corresponding recess, the bolts being axially aligned and defining at least a part of said locking means, there being a sleeve for each bolt, respectively, each sleeve having a pair of open ends, one end of each sleeve being aligned with and surrounding a corresponding hole in the side of the housing, spring means within each sleeve, respectively, for biasing the bolt inwardly;

a stop means on the outer end of each bolt, respectively, for releasably holding the bolt in a retracted condition, each sleeve having an outer, longitudinal slot therein, there being a pin receivable in the slot, the pin being secured to the respective bolt; and means for manually pulling the pin out of the sleeve and into engagement with the outer end face of the corresponding sleeve to hold the corresponding bolt retracted from said housing.

* * * * *